May 18, 1926.
H. F. HEYL ET AL
INSULATED GAUGE ROD
Filed Feb. 27, 1926
1,585,495
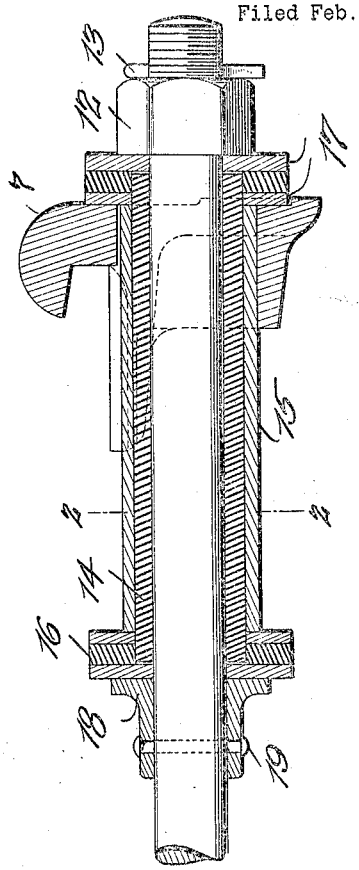
Fig. 1.
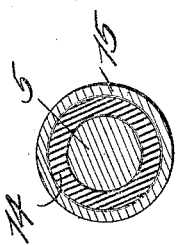
Fig. 2.
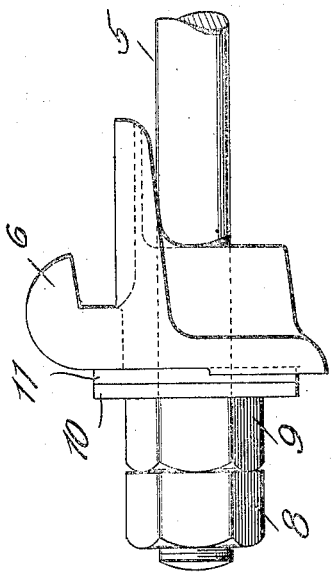
Inventors
H. F. HEYL,
W. G. HULBERT,
By Jas. H. Richmond
Attorney Patented May 18, 1926.

1,585,495

UNITED STATES PATENT OFFICE.

HERMAN F. HEYL AND WILLIAM G. HULBERT, OF EASTON, PENNSYLVANIA, ASSIGNORS TO WILLIAM WHARTON, JR., & COMPANY, INCORPORATED, OF EASTON, PENNSYLVANIA, A CORPORATION OF PENNSYLVANIA.

INSULATED GAUGE ROD.

Application filed February 27, 1926. Serial No. 91,144.

So called gauge rods or elements used to prevent track spread are of the insulated and non-insulated type. Their end adjustments are, or may be, alike and practically the only difference is that in the standard insulated type, insulation material is sleeved onto that portion of the rod adjacent the rail, rail engaging clip and other live metal parts. The life of the insulation is short because it is exposed to all kinds of weather conditions, to cutting or chafing action of the rail or rail parts, sub-structure, as well as flying ballast.

Our invention was devised to remedy these conditions and the nature of the invention consists in providing a simple, inexpensive and practically indestructible insulation assembly for gauge rods, which is readily interchangeable and wherein the insulation material is tightly bound against casual looseness and is fully invested and sealed by protecting means to safeguard it against damage which otherwise would result in rapid deterioration due to exposure to weather or to the wearing action of surrounding parts.

In the accompanying drawings,—

Figure 1 is a sectional elevational view of an insulated gauge rod embodying features of our invention.

Fig. 2 is a section on line 2—2 thereof.

The gauge rod 5 may be as usual and may have the usual end adjusting provisions in accordance with standard practice. We, prefer, however, the arrangement illustrated, in which there are associated with the rod, rail engaging clips 6 and 7, which are interchangeable the one with the other in order to provide for insulating either end of the rod. A pair of nuts 8 and 9 co-operates with washers 10 and 11 and the clip 6 to effect one end adjustment; and a nut 12 restrained by a cotter pin 13 takes care of the other end adjustment.

Either clip, in this instance the clip 7, is insulated, as are likewise the adjacent rail base and other parts liable to short-circuit through the rod, by insulation material 14 sleeved onto the rod. The insulation sleeve is invested by a metal sheath or casing 15 of fairly heavy gauge material as, for example, cast iron pipe, in order to protect it from the destructive action of rain, snow and ice, as well as to guard against blows of flying ballast or the chafing or rubbing action of the rail base or of the ballast. The metal sheath or casing 15 is somewhat shorter than the insulation sleeve so as to permit the assembly thereon, at each end, of insulation collars 16 and end thrust members of the nature of metal facings or protecting washers 17. A collar 18, secured as by a rivet 19, constitutes a fixed abutment which co-operates with the end adjustment to tightly lock the insulation assembly, in which state it will be apparent the sleeve 14 is isolated from exposure to the elements or from contact making for injury or abrasive wear.

Having described our invention, we claim:—

1. Means for insulating gauge rods, comprising the combination with a gauge rod and the elements to be insulated, of a main insulating body sleeved onto the rod, a body seal, and insulated end seals.

2. Means for insulating gauge rods, comprising the combination with a gauge rod and the elements to be insulated, of a main insulating body sleeved onto the rod, a rigid body seal, separate end seals, and means for securing the assemblage as a unit.

3. Means for insulating gauge rods, comprising the combination with a gauge rod, an end adjustment therefor, and the elements to be insulated, of a main insulating body sleeved onto the rod, a body seal, end seals, and a fixed abutment co-operating with the end adjustment of the rod to lock the assemblage in sealing relation and to prevent end play thereof.

4. Means for insulating gauge rods, comprising the combination with a gauge rod and the elements to be insulated, of a main insulating body for the rod, a metal casing for the body, end seals, and means including interchangeable clips for securing the assemblage at either end of the rod.

5. Means for insulating gauge rods, comprising the combination with a gauge rod and the elements to be insulated, of an insulating sleeve for the rod, a rigid metal housing stopping short of the ends of the sleeve, insulated end seals for the housing, end thrust devices, and means for locking the assemblage as a unit.

In testimony whereof we affix our signatures.

HERMAN F. HEYL.
WILLIAM G. HULBERT.